United States Patent
Hubbard, Jr. et al.

(10) Patent No.: US 9,364,814 B2
(45) Date of Patent: Jun. 14, 2016

(54) EXTRUDED BODY DEVICES INCLUDING SHEET MATERIAL HOLE MASKING

(71) Applicant: Corning Incorporated, Corning, NY (US)

(72) Inventors: Larry Gleason Hubbard, Jr., Horseheads, NY (US); James Scott Sutherland, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 14/360,942

(22) PCT Filed: Nov. 28, 2012

(86) PCT No.: PCT/US2012/066724
§ 371 (c)(1),
(2) Date: May 28, 2014

(87) PCT Pub. No.: WO2013/082066
PCT Pub. Date: Jun. 6, 2013

(65) Prior Publication Data
US 2014/0318185 A1    Oct. 30, 2014

Related U.S. Application Data

(60) Provisional application No. 61/564,417, filed on Nov. 29, 2011.

(51) Int. Cl.
*B28B 11/00* (2006.01)
*F28F 21/04* (2006.01)
(Continued)

(52) U.S. Cl.
CPC ............. *B01J 19/248* (2013.01); *B28B 11/006* (2013.01); *B28B 11/12* (2013.01); *F28F 7/02* (2013.01); *F28F 21/006* (2013.01); *F28F 21/04* (2013.01);
(Continued)

(58) Field of Classification Search
CPC .. C04B 38/0012; B28B 11/006; B28B 11/007
See application file for complete search history.

(56) References Cited

U.S. PATENT DOCUMENTS 5,774,779 A * 6/1998 Tuchinskiy ................. 419/2
8,197,769 B2   6/2012 Caze et al.
(Continued)

FOREIGN PATENT DOCUMENTS

CN   101041248 A   9/2007
CN   101687355 A   3/2010
(Continued)

OTHER PUBLICATIONS

International Search Report pertaining to International Application No. PCT/US12/66724 dated Feb. 8, 2013.
(Continued)

*Primary Examiner* — Erin Snelting
(74) *Attorney, Agent, or Firm* — Gregory V. Bean

(57) ABSTRACT

A method of making a fluidic device is provided. The method includes locating a meltable sheet material on a face of an extruded body including extended cells therein. At least some of the cells are interconnected by melting the sheet material such that the melted sheet material flows into the at least some of the cells to form a fluidic passage through the body defined within the at least some of the cells. The fluidic passageway may have a longitudinally serpentine path back and forth along the at least some of the cells.

20 Claims, 12 Drawing Sheets

(51) Int. Cl.
*B01J 19/24* (2006.01)
*B28B 11/12* (2006.01)
*F28F 7/02* (2006.01)
*F28F 21/00* (2006.01)

(52) U.S. Cl.
CPC ......... *F28F 2220/00* (2013.01); *F28F 2255/16* (2013.01)

(56) References Cited

U.S. PATENT DOCUMENTS

| | | |
|---|---|---|
| 8,211,376 B2 | 7/2012 | Caze et al. |
| 8,211,377 B2 | 7/2012 | Caze et al. |
| 2002/0135107 A1* | 9/2002 | Nishi et al. .................... 264/630 |
| 2006/0103057 A1* | 5/2006 | Kouketsu ...................... 264/630 |
| 2006/0272306 A1 | 12/2006 | Kirk et al. |
| 2008/0230951 A1 | 9/2008 | Dannoux et al. |
| 2010/0143215 A1* | 6/2010 | Caze et al. .................... 422/198 |
| 2012/0306123 A1* | 12/2012 | Maurey et al. ................ 264/494 |

FOREIGN PATENT DOCUMENTS

| | | |
|---|---|---|
| WO | 9819812 A1 | 5/1998 |
| WO | 2011106758 A1 | 9/2011 |

OTHER PUBLICATIONS

International Preliminary Report on Patentability pertaining to Application No. PCT/US12/66724 dated Jun. 3, 2014.
European Search Report pertaining to Application No. 12853550.7 dated Nov. 12, 2015.
European Supplemental Search Report pertaining to Application No. 12853550.7 dated Nov. 27, 2015.
Chinese Office Action pertaining to Application No. 201280067515.2 dated Oct. 14, 2015.
EP12853550 Extended Search Report Dated Jan. 6, 2016.

* cited by examiner

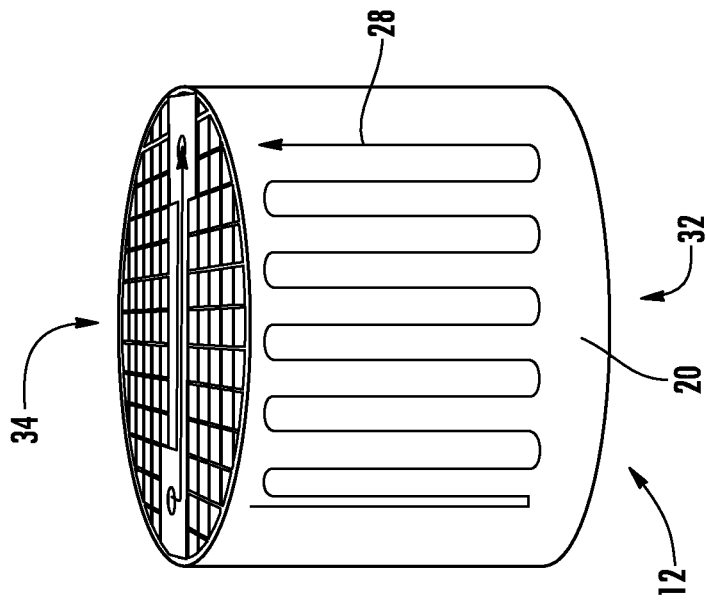
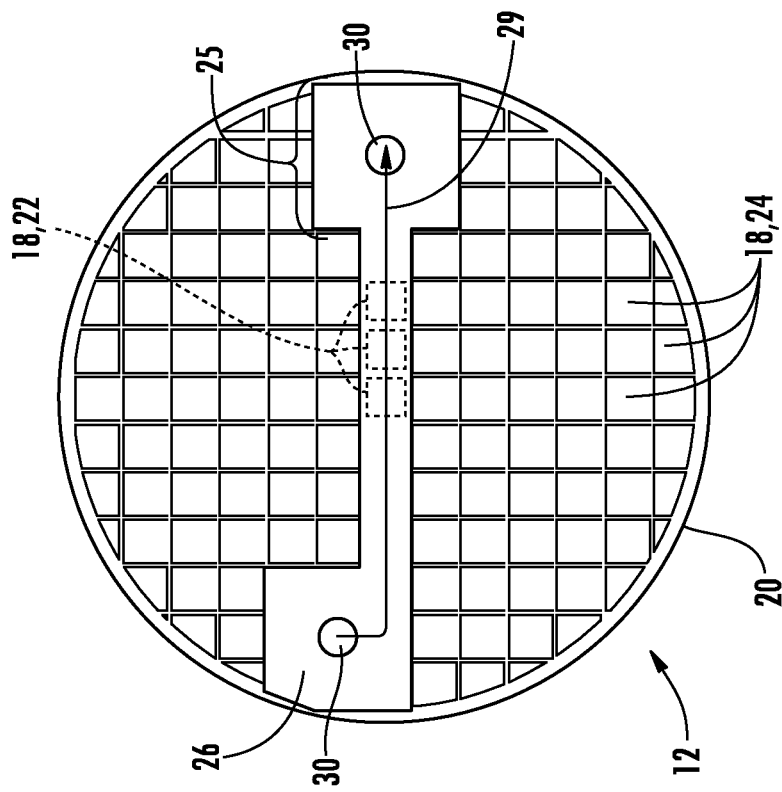

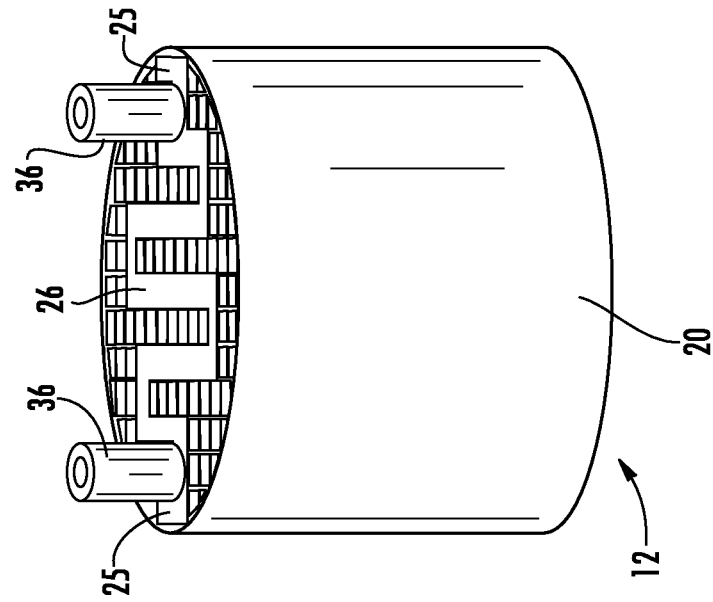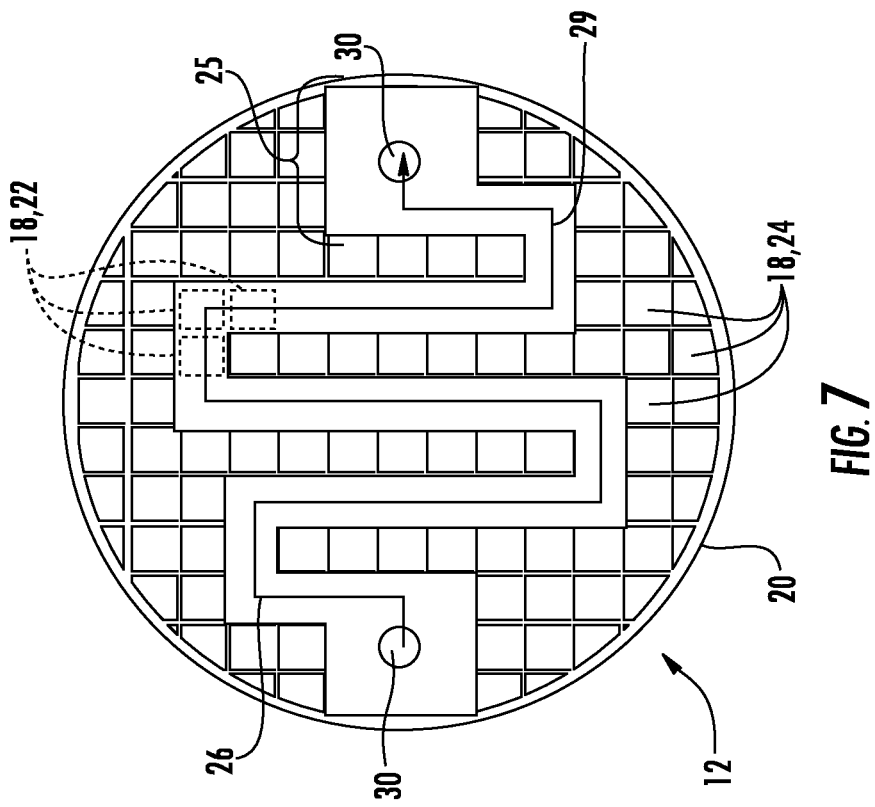

US 9,364,814 B2

EXTRUDED BODY DEVICES INCLUDING SHEET MATERIAL HOLE MASKING

This application claims the benefit of priority under 35 USC §119 of U.S. Provisional Application Ser. No. 61/564,417 filed on Nov. 29, 2011 the content of which is relied upon and incorporated by reference in its entirety.

FIELD

The present disclosure relates generally to extruded body devices such as honeycomb reactors, more specifically to devices and methods for use with extruded body devices, particularly to devices and methods for fluid routing, fluid porting, manifolding, and sealing in or in conjunction with honeycomb continuous flow reactors.

BACKGROUND

Microreactor-type chemical processing units have been proposed where fluids (liquids or gases) are guided in etched, molded, drilled or otherwise formed fluid channels in or on planar substrates. Fluid channels are patterned with elementary fluidic structures (e.g., mixers and residence time segments) to form circuits that provide more complex chemical processing functions. Planar substrates can be stacked to extend functionality in a single reaction unit, providing a modular chemical processing system that can target multiple applications.

SUMMARY

In one embodiment, a method of making a fluidic device is provided. The method includes locating a meltable sheet material on a face of an extruded body including extended cells therein. At least some of the cells are interconnected by melting the sheet material such that the melted sheet material flows into the at least some of the cells to form a fluidic passage through the body defined within the at least some of the cells. The fluidic passageway has a longitudinally serpentine path back and forth along the at least some of the cells.

In another embodiment, a method of making a fluidic device is provided. The method includes locating temporary fillers within at least some cells of an extruded body. A meltable sheet material is located on a face of the extruded body. Others of the cells are interconnected by melting the sheet material such that the melted sheet material flows into the others of the cells to form plugs within the other of the cells. Entry of the melted sheet material into the at least some cells is blocked using the temporary fillers.

In another embodiment, a method of making a fluidic device is provided. The method includes forming a filler material comprising powder that does not sinter together at temperatures up to about 1150° C. and a binder. The filler material has a paste-like consistency. The filler material is located within at least some cells of an extruded body to form temporary fillers. Others of the cells are interconnected by melting a meltable material such that the melted meltable material flows into the others of the cells to form plugs within the other of the cells. Entry of the melted meltable material into the at least some cells is blocked using the temporary fillers.

Additional features and advantages of the claimed subject matter will be set forth in the detailed description which follows, and in part, will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 1 is a plan view of a device for fluid processing, such as a heat exchanger or combination heat exchanger and reactor, comprising an extruded multicellular body or honeycomb showing a fluidic path in a plane perpendicular to cells of the body according to one embodiment;

FIG. 2 is a side elevation view of the device of FIG. 1 comprising an extruded multicellular body, showing additional detail of a fluidic path according to an embodiment;

FIG. 7 is a plan view of reactor comprising an extruded multicellular body or honeycomb showing an alternate fluidic path in a plane perpendicular to the cells according to an embodiment;

FIG. 8 is a side elevation view of the device of FIG. 7 showing fluidic couplers on the extruded body according to one embodiment;

DETAILED DESCRIPTION

Figure 4:
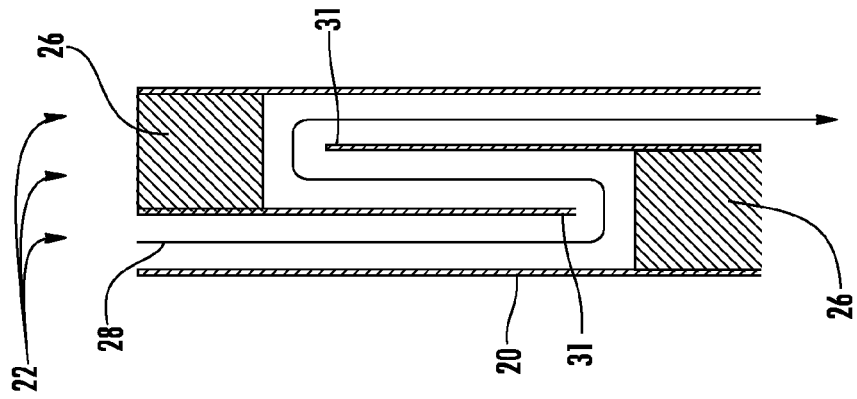
FIG. 4 is a cross-sectional view similar to that of FIG. 3, useful for illustrating the meaning of the term serpentine as used herein.

Embodiments described herein generally relate to a device 12 for processing fluids, such as a reactor or heat exchanger, or combination reactor and heat exchanger, for example, comprising an extruded body or monolith 20 having multiple elongated cells 18 therein, an embodiment of which is represented in plan view in FIG. 1, and in perspective view in FIG. 2. The device includes one or more plugs 26 formed of a sheet material, such as glass, that are used to plug selected ones of the cells 18. Devices 12 are described in detail in pending U.S. patent application Ser. No. 12/593,521 entitled EXTRUDED BODY DEVICES AND METHODS FOR FLUID PROCESSING, filed Mar. 31, 2008 and U.S. patent application Ser. No. 12/346,090 entitled DEVICES AND METHODS FOR HONEYCOMB CONTINUOUS FLOW REACTORS, filed Dec. 30, 2008 the details of both of which are hereby incorporated herein by reference.

The extruded body 20 has a first fluidic passage 28 therethrough, defined principally within at least some of said cells 18, the first fluidic passage 28 having a longitudinally serpentine path back and forth along the at least some of said cells 18, and located between a top end face 32 and an end face 34 opposite the top end face 32 of the device 12, as seen in FIG. 2. The first fluidic passage 28 is desirably defined within a first plurality 24 of the cells 18, as seen in FIG. 1. At least a portion of the first fluidic passage 28, with respect to a plane perpendicular to the cells as shown in the view of FIG. 1, desirably lies in a path 29 bordered by a second plurality of cells 22 not of the first plurality 24. For highest heat exchange capability, it may be desirable that the path 29 is only one or two cells wide over all or at least the major portion of its length, with a width of one cell shown in this case, although paths and multiple cells wide may also be used. A narrow path can allow for a large ratio of contact-area to volume for the passage 28—that is, a large ratio of (1) the contact area of the passage 28 with cells 22 of the second plurality, to (2) the volume of the first fluidic passage 28, which large contact area to volume ratio is beneficial for heat exchange or for other purposes requiring close proximity of the passage 28 to the cells 22. In the embodiment shown in FIGS. 1 and 2, the cells 24 of the first plurality are also contiguous, which may provide for efficient use of space within the body 20.

Figure 3:
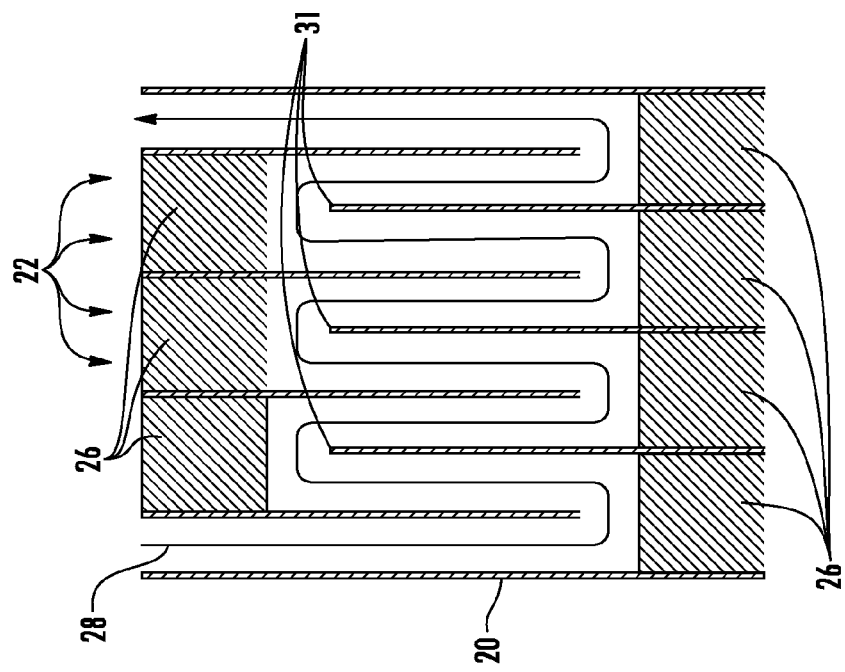
FIG. 3 is a cross-sectional view of cells closed on one or both ends of an extruded body, showing one method useful in the context of the present disclosure for interconnection between cells.

In the particular embodiment shown in FIGS. 1 and 2, the first fluidic passage 28 is defined in part by one or more plugs 26 positioned at one or more ends of said body 20. This may be seen in more detail, in another example embodiment, in the cross section of FIG. 3. As will be described in greater detail below, the plugs 26 may be formed from a sheet material, such as glass. Selected end portions of walls 31 dividing the cells 22 which cooperate to in part define the passage 28 have been removed, and plugs 26 have been positioned such that the material forming the plugs 26 is spaced apart from the remaining portion of the walls 31, so as to interconnect the cells 22. The first fluidic passage 28 is thus defined within cells 22 of the first plurality, and is in part defined also by plugs or continuous plugging material 26. Note that the passage 28 need not have as many bends as that of FIG. 3 to qualify as serpentine as this term is used herein. It is sufficient that the passage forms an "S" shape in the longitudinal direction, that is, the direction along the cells, as shown in FIG. 4.

Figure 6:
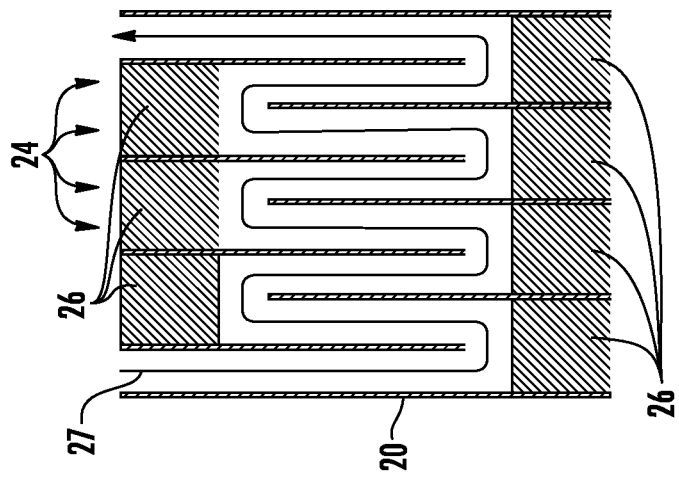
FIG. 6 is a cross-sectional view of the device of FIG. 5.

The cells 24 of the second plurality may be all open in parallel, such that one or more fluids may be flowed straight through the body 20 along the cells 24, as shown generally in FIGS. 1 and 2. Alternatively, as shown generally in FIGS. 5 and 6, where the cross section of FIG. 6 is taken generally along a path 23 shown in FIG. 5, at least one second fluidic passage 27 may be defined principally within at least some of the cells 24 of the second plurality, the second fluidic passage 27 also having a longitudinally serpentine path back and forth along the at least some of said second plurality of cells 24. In the embodiment shown, the second fluidic passage 27, with respect to a plane perpendicular to the cells 18 of the body 20, lies in the path 23 shown in FIG. 5.

In another embodiment, the path is not serpentine only in the direction along the cells as shown in FIG. 2, but also in the plane perpendicular to the cells, as shown in the plan view of FIG. 7. The first plurality of cells 22 in the plan view of FIG. 7 is arranged in a generally serpentine path in the plane perpendicular to the cells 18. The fluid passage 28 is thus serpentine at a relatively higher frequency in the longitudinal direction, in and out of the plane of FIG. 7, and at a relatively lower frequency in the perpendicular direction, within the plane of the figure. This doubly serpentine path structure can allow for high total path volume and long total path length while maintaining a large surface area between the path and the cells 24, and can allow for small total package size for the device 12.

The serpentine arrangement of the first plurality of cells 22, visible in FIG. 7, is one embodiment; other arrangements are possible or even desirable, depending on the application. For highest heat exchange, as mentioned above, regardless of the shape of the path within the plane of FIGS. 1, 5 and 7, it may be desired that the majority of the path be narrow, only one or two cells wide. This results first fluidic passage 28 capable of having very high surface to volume ratio and long length in a compact volume, but one that is nonetheless easily manufactured.

Figure 5:
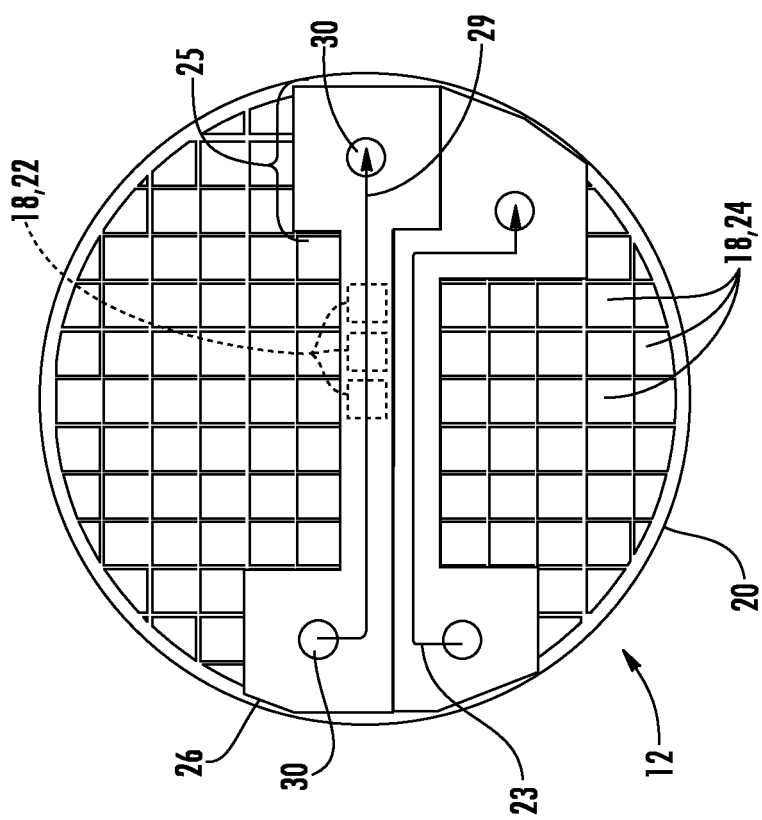
FIG. 5 is a plan view of reactor comprising an extruded multicellular body or honeycomb showing a second fluidic path in a plane perpendicular to the cells according to another embodiment.

Additional cells of cells 18, in a grouping 25 of more than one cell in width, if desired, may be plugged around entry and exit ports 30 of the passage 28 and path 29, as shown in FIGS. 1 and 5. These additional plugged cells can provide support for an O-ring seal or a fired-frit seal or other sealing system for providing a fluidic connection to the passage 28, and optionally may not form a part of the passage 28. One alternative is shown in the embodiment of FIG. 8, in which access tubes 36 have been sealed to two groupings 25 of plugged cells. As may be seen from the figure, this has the effect of putting fluidic passage 28 in fluid communication with the exterior of the extruded body 20 through an end of the extruded body. Both ends may be used if desired.

The extruded body or honeycomb 20 is desirably formed of an extruded glass, glass-ceramic, or ceramic material for durability and chemical inertness, although any extrudable material having desired properties could potentially be used, including such widely varying materials as metals, polymers, graphite/carbon, etc. Carbon or metal monoliths may be coated, such as with enamel or PTFE coatings, for example. Ceramic materials may include metal oxides such as alumina, aluminum titanate, zirconia, magnesia, or non-oxide ceramics such as silicon carbide, silicon nitride, aluminium nitride, slicon aluminum oxynitride, and titanium diboride, or silicate ceramics such as cordierite, mullite, steatite, and porcelain. Alumina ceramic has good strength, good inertness, and higher thermal conductivity than glass and some ceramics. The multicellular body may have a cell density of as much as 200 cells per square inch. Higher densities can lead to higher heat exchange performance devices. Bodies having 300 or more, or even 450 or more cells per square inch are of potential interest for forming high heat-exchange performance devices.

Figure 9:
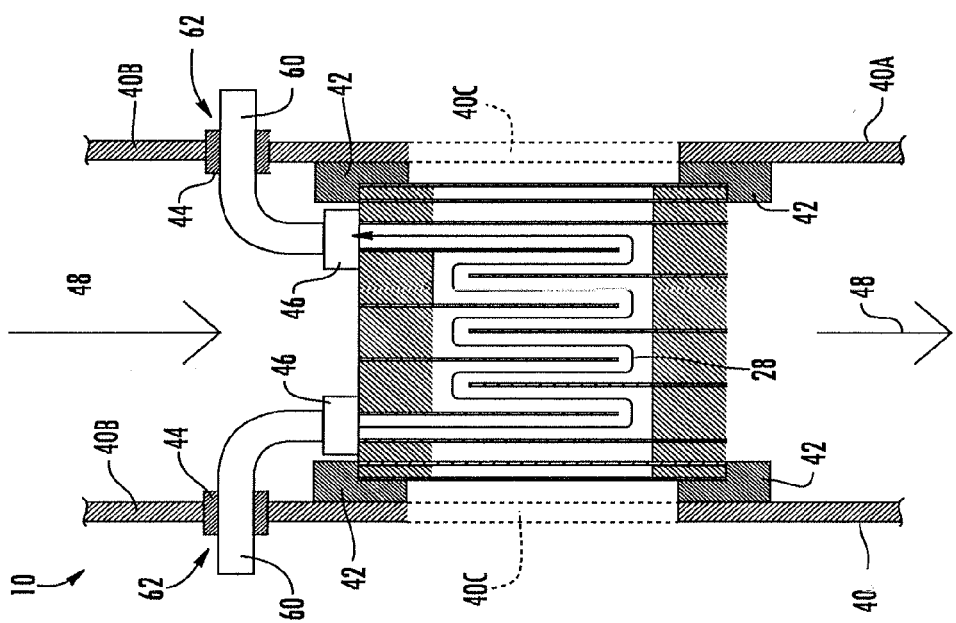
FIG. 9 is a cross-sectional view of one embodiment of a fluidically connected device.

FIG. 9 is a cross-sectional view of a fluidically connected device 10 for fluid processing, comprising an extruded multicellular body 20 and showing one alternative for providing fluid connections to the extruded body 20. In the embodiment of FIG. 9, a fluid housing 40 supports the extruded body via seals 42. The housing 40 may comprise a single unit enclosing the extruded body, or the portions 40C may optionally be excluded, such that the housing comprises two parts 40A and 40B. A fluid passage 48, which may be used for flowing a thermal control or other fluid, is formed through the second plurality of cells 24—which are in this case open, as shown in FIGS. 1 and 7—in cooperation with the housing 40. The fluid passage 48 thus constitutes another type of second fluidic passage, comprising a single pass through the body, in parallel through multiple cells of the second plurality of cells, in contrast to the second passage 27 of FIG. 5. Both types may be used in the same body 20, if desired.

In the device 10 of FIG. 9, passage 28 in the body 20 is accessed via fluid conduits 60 through fluidic couplers 46. Fluid conduits 60 pass through openings 62 in the housing 40, in which openings 62 a seal 44 is employed.

Figure 10:
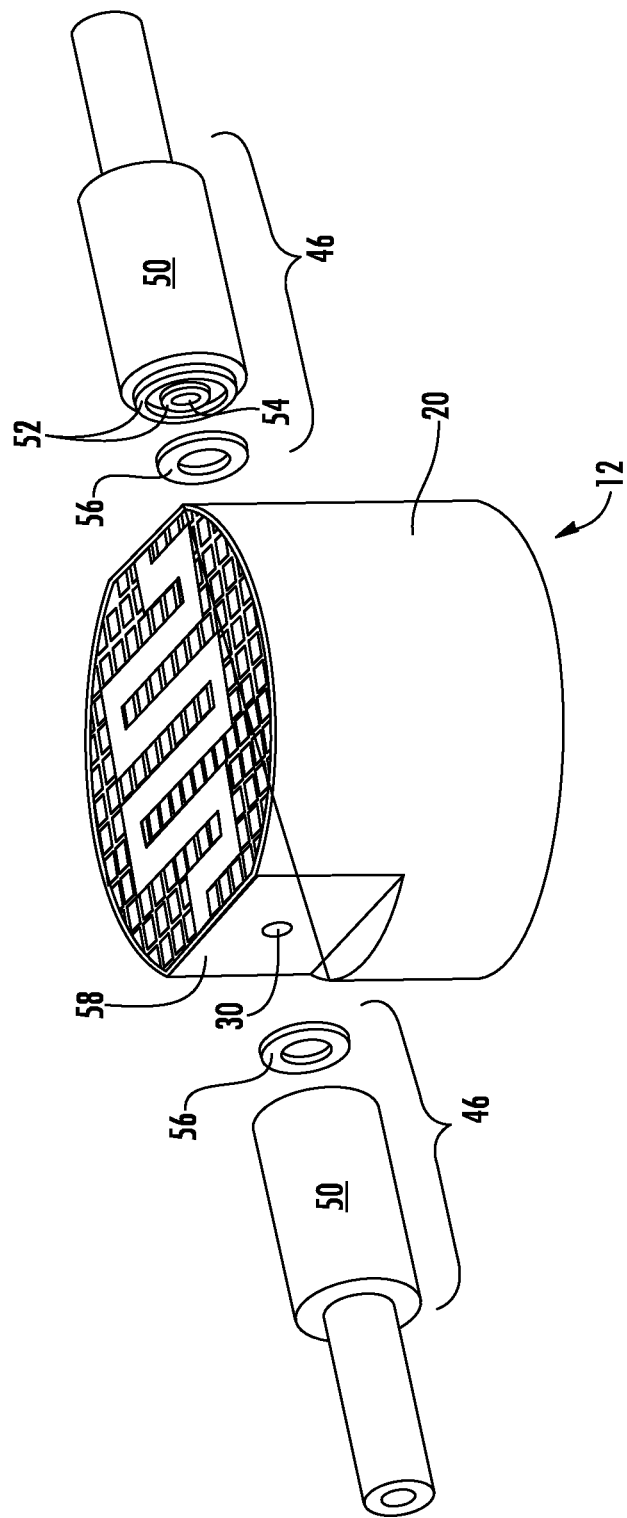
FIG. 10 is an exploded perspective view of a device comprising an extruded multicellular body or honeycomb, showing fluidic couplers coupled to input and output ports at the side(s) of the extruded body.

FIG. 10 is an exploded perspective view of a reactor 12 comprising an extruded multicellular body or honeycomb, showing fluidic couplers 46 arranged for coupling to input and output ports 30 at the side(s) of the extruded body 20. Fluidic couplers 46 include a fluid coupler body 50 having raised concentric rings 52 surrounding a fluid passage 54. When assembled, an elastomeric O-ring 56 is retained by the raised rings 52 in compression against a flat surface 58 formed on the sided of the body 20. The flat surface 58 may be formed by removing a few rows of cells 18 in the area where the fluid connection is to be made. The large number of wall structures per unit area remaining within the extruded body 20 has been shown to provide sufficient support for a robust compression seal against the flat surface 58.

Figure 11:
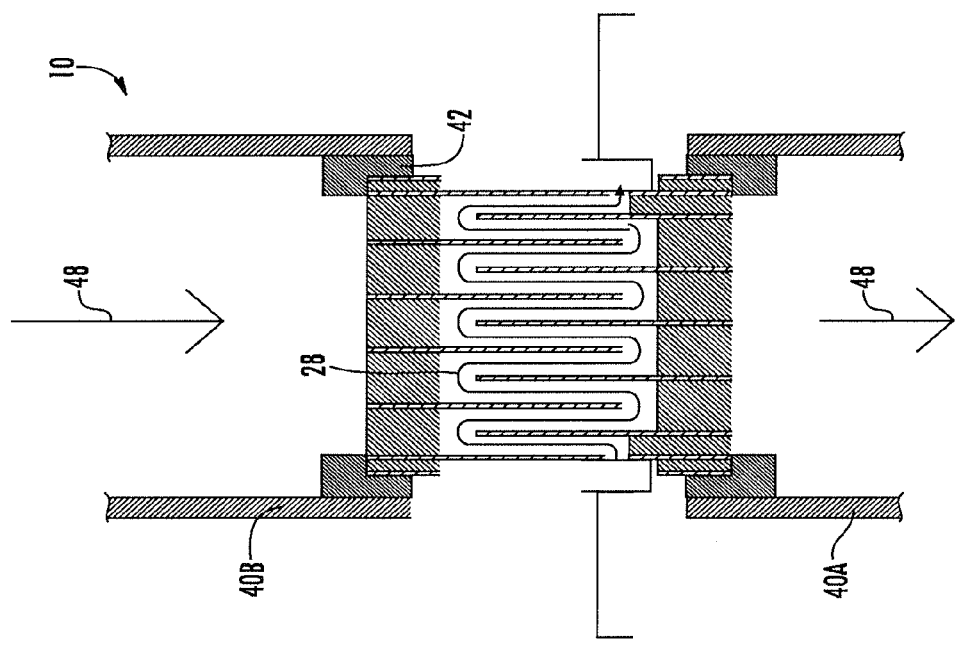
FIG. 11 is a cross-sectional view of a reactor of the present disclosure comprising an extruded multicellular body or honeycomb showing fluidic connections to the extruded body according to another embodiment.

A device 12 such as the one in the embodiment of FIG. 10, arranged such that the first fluidic passage 28 is in fluid communication with the exterior of the extruded body 20 through a surface 58 of the extruded body 20 generally parallel the cells 18, allows for a desirable configuration of a fluidically connected device 10. As shown in FIG. 11, this desired arrangement is shown in cross-sectional view of the connected device 10 comprising an extruded multicellular body or honeycomb 20 with fluidic connections to the body 20. Features corresponding to the embodiment of FIG. 9 are labeled accordingly. Advantages may include the absence of seals 44, and absence of any seal (such as seals 44 or fluidic couplers 46) directly between the two fluid passages 28, 48. Seal materials may thus be optimized for the fluid of each path independently, and seal failures, if any, will not result in fluids from the two passages 28, 48 intermixing.

Figure 13:
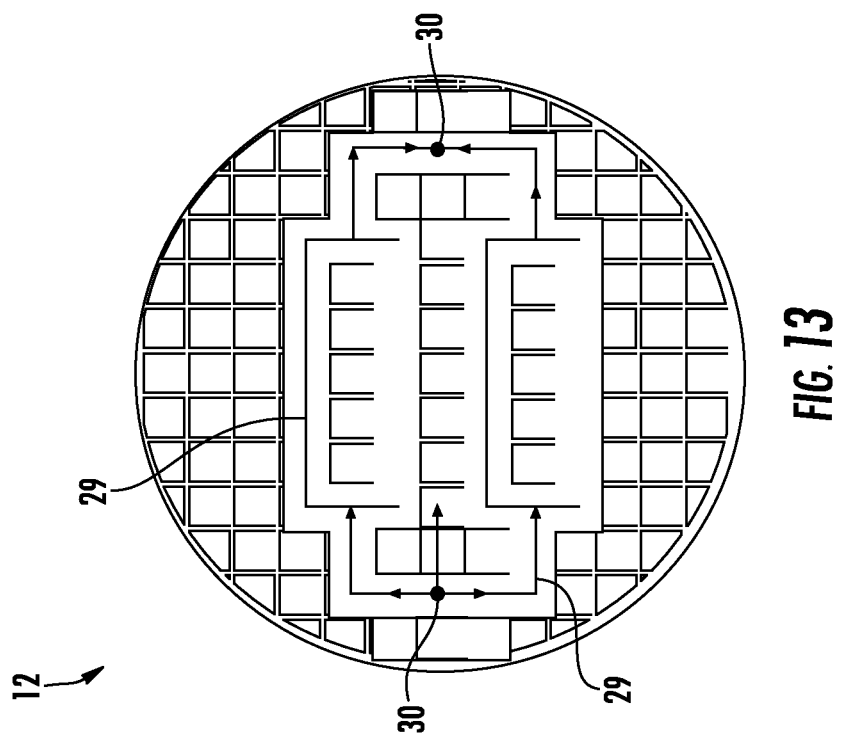
FIG. 13 is a plan view of a device comprising an extruded multicellular body or honeycomb showing still another fluidic path in a plane perpendicular to the cells according to an embodiment.
Figure 12:
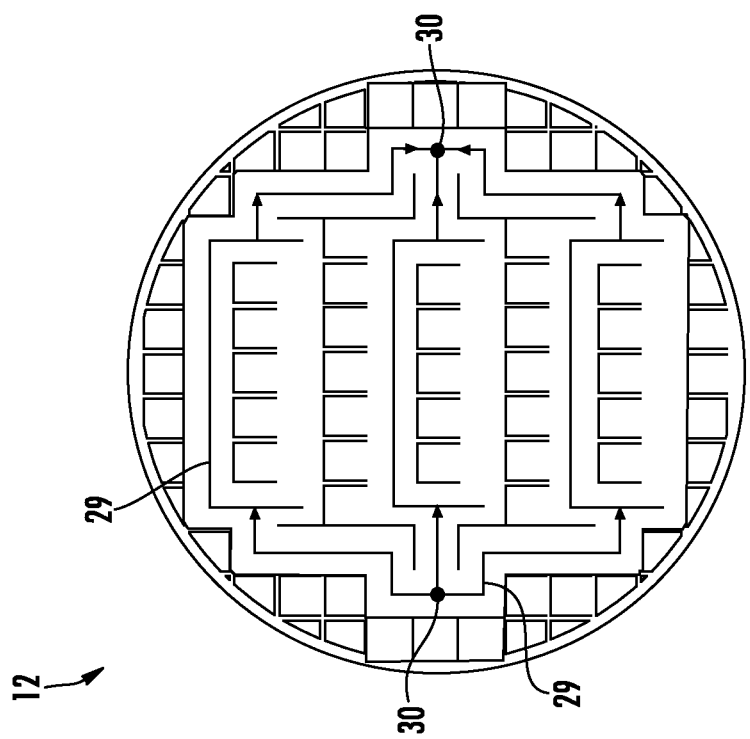
FIG. 12 is a plan view of a device comprising an extruded multicellular body or honeycomb showing yet another fluidic path in a plane perpendicular to the cells according to an embodiment.
Figure 14:
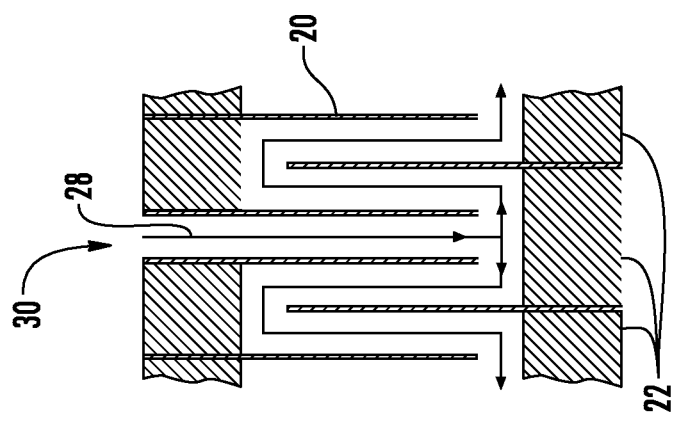
FIG. 14 is cross-sectional view of cells closed on one or both ends of an extruded body, showing a method useful in the context of the present disclosure for manifolding or dividing fluid pathways, with two pathways beginning from one and beginning within the extruded body.

FIGS. 12 and 13 are plan views of devices 12 for fluid processing comprising an extruded multicellular body or honeycomb 20 showing still another fluidic path 29 in a plane perpendicular to the cells 18, according to additional alternative embodiments of the present disclosure. As may be seen in the figures, these embodiments include manifolding within the fluid path 29, such that the path 29 divides into parallel paths in the plane perpendicular to the cells. FIG. 14 is cross-sectional view of cells 22 of the first plurality, closed on one or both ends of the extruded body 20, showing one method useful in the context of the present disclosure for manifolding or dividing a fluid path 29 and passage 28 to achieve the paths 29 shown in FIGS. 12 and 13, with two fluid passages or branches of a fluid passage 28 dividing from one in a plane parallel to the cells 22, 24, and beginning to branch within the extruded body 20.

Figure 15:
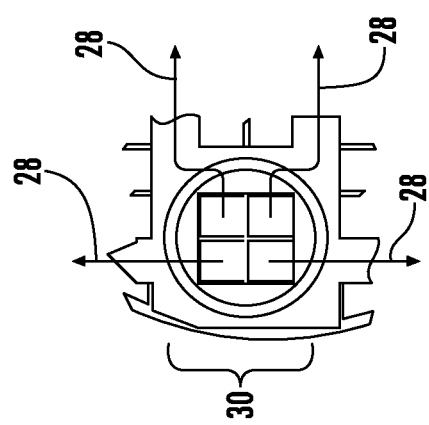
FIG. 15 is a partial plan view of one end of an extruded body or honeycomb structure showing multiple passages beginning within the extruded body at an input port on the one end of the extruded body.

Manifolding with the resulting multiple paths may be used where it is desired to reduce the pressure drop of fluids moving through the device. FIG. 15 is a partial plan view of one end of an extruded body or honeycomb structure showing a method of or structure for manifolding having multiple parallel branches of passage 28 or and/or path 29, beginning within the extruded body at an input port 30 on the one end of the extruded body. Such manifolding is achieved by simply increasing the number of unplugged cells at the port 30 from one to four, as shown, or more.

Figure 16:
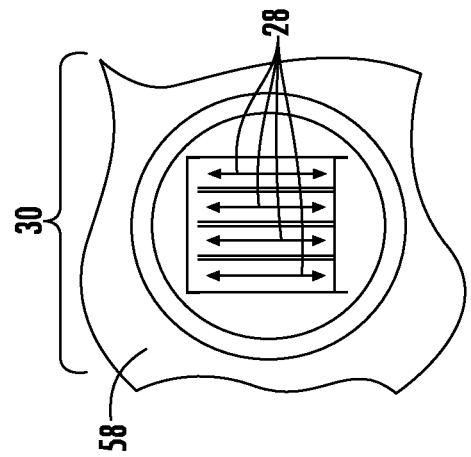
FIG. 16 is a partial side view of an extruded body or honeycomb structure showing multiple passages beginning within the extruded body at an input port on a wall on a side of the extruded body.

FIG. 16 is a partial side view of an extruded body or honeycomb structure showing another embodiment of multiple passages 28 beginning within the extruded body at an input port 30 on a wall or flat surface 58 on a side of the extruded body, such as shown in FIG. 10. Similar to the embodiment of FIG. 15, multiple parallel branches of fluidic passage 28 and path 29 are achieved by providing an opening of the port 30 that is large relative to the size of the cells 18. In addition to providing access to multiple cells in parallel— four in the figure—the passage 28 may lead in both directions, as one alternative, as shown by the arrows. Using only one direction for each branch of the passage 28 is also an alternative.

Figure 17:
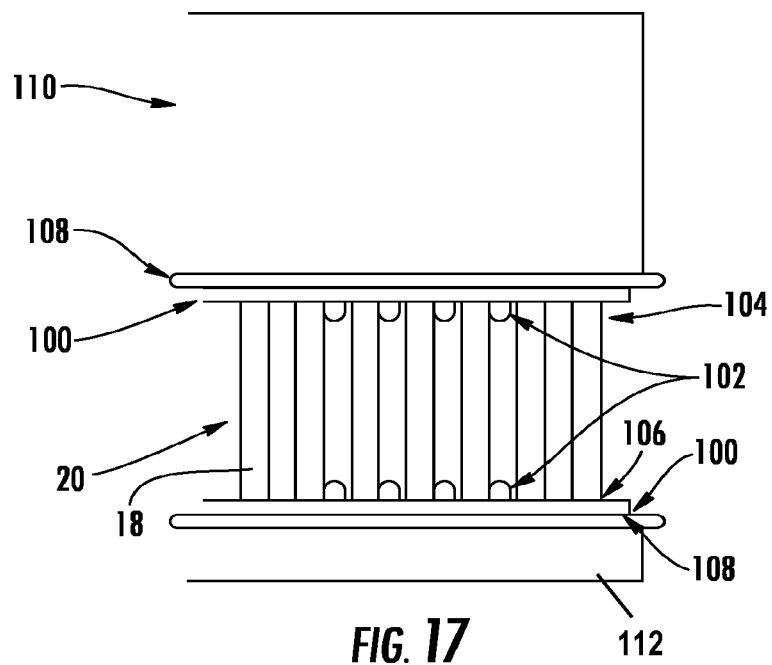
FIG. 17 illustrates a system and process for forming a device for fluid processing, such as a heat exchanger or combination heat exchanger and reactor, comprising an extruded multicellular body or honeycomb having a fluidic path according to an embodiment.

Referring to FIG. 17, as indicated above, plugs 26 are used to interconnect at least some of the cells 18 (FIGS. 1 and 2). The plugs 26 may be referred to as being permanent in that the plugs 26 may be formed such that their removal would require some form of breaking or damaging of the plugs 26 and/or the surrounding extruded body 20 and are intended to form part of the finished device 12. FIG. 17 illustrates a system and method for forming the permanent plugs 26 using a sheet material 100 (e.g., formed of glass). Before locating the sheet material 100 on the extruded body 20, a filler 102 is inserted in at least some or all of the cells 18 that are to remain open (e.g., see cells 22 of FIG. 1). The filler 102 may be referred to as being temporary as the filler is removable from the cells 22 without damaging the surrounding extruded body 20 and are not intended to form part of the finished device 12.

Selective glass sheet sealing of the extruded body 20 cells 18 can be accomplished by inserting the temporary fillers 102 into all of the cells 18 that are intended to remain open in the finished device 12. In some embodiments, the temporary filler 102 may be formed of a silicon carbide powder or some other powder such as a ceramic powder that will not sinter together at temperatures used in the sheet plugging process (e.g., 950° C.). Exemplary refractory ceramic materials that may be suitable for forming the temporary filler 102 include alumina, zirconia and mullite. Particle sizes for the temporary filler 102 may be relatively large, such as particles being at least about 50 μm diameter, such as at least about 100 μm diameter, such as at least about 150 μm diameter, though smaller particle sizes may be used. The particles forming the temporary filler 102 may also have a jagged or oblong (i.e., non-spherical) shape. Such a non-spherical shape can aid the temporary filler 102 to retain its shape and not crumble or disintegrate after organic binders have been removed. Such a non-spherical particle shape may also aid in resistance to filler 102 shape change during the plug forming process, when the temporary filler 102 is placed in compression as glass softens and flows around the temporary filler 102. The temporary filler 102 may initially be a formed of a paste that is formed by mixing the filler powder (e.g., about 85 weight percent) with an organic binder, such as tall oil or some other oil type. The resulting filler paste may have a viscosity 150,000 to 2,000,000 cps, so that it spreads and retains its shape after the spreading.

After locating the temporary fillers 102 within the individual cells 18, the sheet material 100 may be located over a top end face 104 of the extruded body 20. Another sheet material 100 may be located beneath (or at the end face 106 opposite the top end face) of the extruded body 20. The sheet material 102 may be formed of glass whose coefficient of thermal expansion (CTE) is matched to the material forming the extruded body 20. As one example, for an alumina extruded body 20, a 1.0 mm thick sheet of glass may be used for the sheet material 102. Additionally, the sheets 102 may be formed of the same or of different materials. A refractory felt layer 108 may be placed over the upper sheet material 100. The felt layer 108 can provide a barrier between the sheet materials 100 and a weight 110. The refractory felt layer 108 may be useful in preventing the sheet material 100 from sticking to the weight 110 after the high temperature forming process. A similar felt layer 108 may be provided between the lower sheet material 100 and a support surface 112. The felt layers 108 may be formed of alumina felt (e.g., about 1.5 mm thick). The weight 110 may be at least about 45 g over each square cm of end face area of the extruded body 20.

Figure 18:
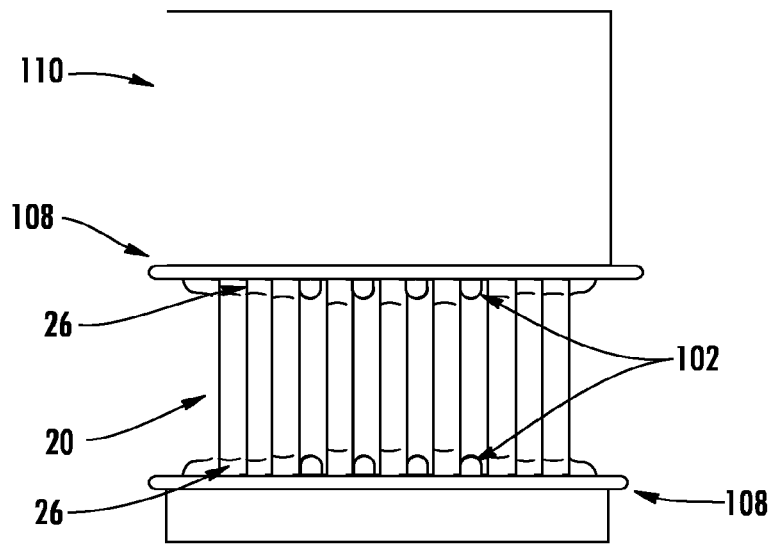
FIG. 18 illustrates the system and process of FIG. 17 with melted sheet material entering at least some cells of the extruded body.

Referring to FIG. 18, during the plug forming process (e.g., at no more than about 1150° C., at no more than about 1723° C. in an inert gas atmosphere), glass material of the sheet materials 100 softens and is forced into the non-plugged cells 18 due to the force of the weight 110. The temporary fillers 102 prevent flow of the glass sheet material into the cells 18 blocked by the temporary fillers 102. The temporary fillers 102 are formed such that they are not displaced by the flow of glass into the neighboring cells 18.

Figure 19:
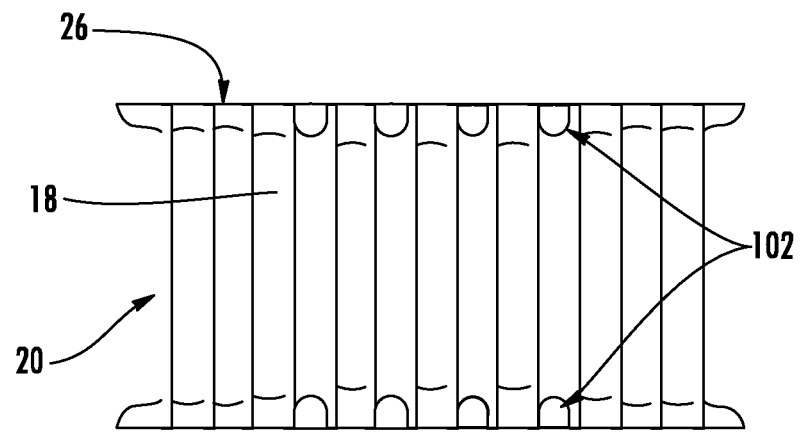
FIG. 19 illustrates an extruded multicellular body or honeycomb having permanent plugs interconnecting at least some cells and temporary fillers blocking formation of the plugs in others of the cells.

Referring to FIG. 19, after forming the permanent plugs 26 from the sheet materials 100, the permanent plugs 26 may generally be thicker in cells 18 adjacent the cells 18 having the temporary fillers 102 due to the diversion of the flowing glass away from the cells 18 having the temporary fillers 102. In some embodiments, plug thickness can be tuned by adjusting the areal density of the temporary fillers 102 across the end face of the extruded body 102 and/or by changing or varying the thickness of the sheet material 100 for example, by using multiple, thin sheets that are stacked within discrete regions, or a sheet that is hot pressed to modify its thickness in selected regions.

Figure 20:
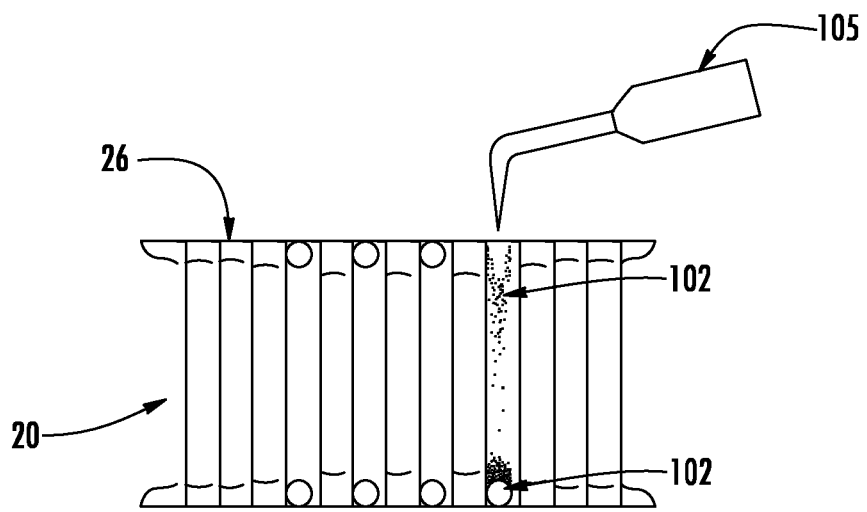
FIG. 20 illustrates a system and process for removing the temporary fillers according to an embodiment.

Referring to FIG. 20, the temporary fillers 102 may be removed after formation of the permanent plugs 26 any number of suitable ways. For example, a manual probe 105 may be used or a blast of air or other material may be used to break and remove the temporary fillers 102 from the cells 18, without damaging the plugs 26 or the surrounding extruded body 20. The end faces of the extruded body 20 may be polished to remove any glass sheet material that may have fused with the temporary fillers 102 to provide the finished body 20.

Figure 21:
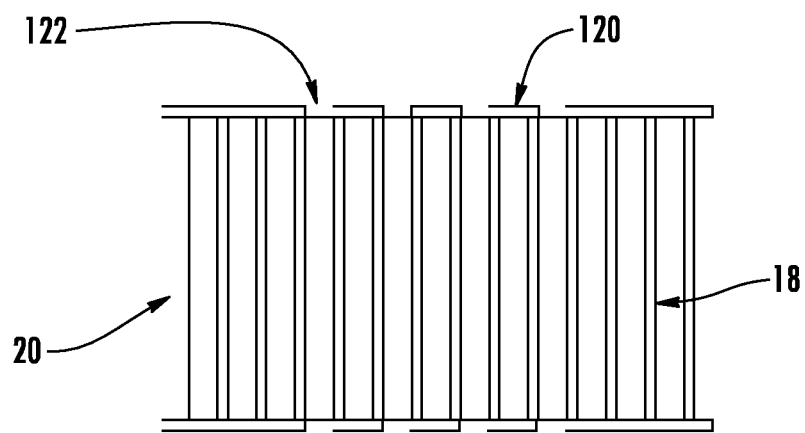
FIG. 21 illustrates a system and method of forming the temporary fillers of FIGS. 19 and 20 according to an embodiment.

Any suitable process may be used to provide the selected cells 18 with the temporary fillers 102. Referring to FIG. 21, for example, a mask 120 may be provided with a pattern of openings 122 that correspond to the cells 18 into which the temporary fillers 102 are to be placed. As one example, the mask 120 may have a pressure sensitive adhesive layer applied thereto to adhere the mask to the end face of the extruded body 20. The pattern of openings 122 may be cut into the mask 120 before the mask 120 is located on the extruded body 20 using, for example, a computer controlled mask cutter. Alternatively, the mask 120 may be patterned with the openings 122 after the mask 120 is applied to the extruded body 20, for example, using a laser mask cutter or a hot tool that pierces the mask 120 at the desired locations. Various methods for forming the openings 122 include stencil cutting, tape stripping, laser cutting and photolithographic patterning.

Figure 22:
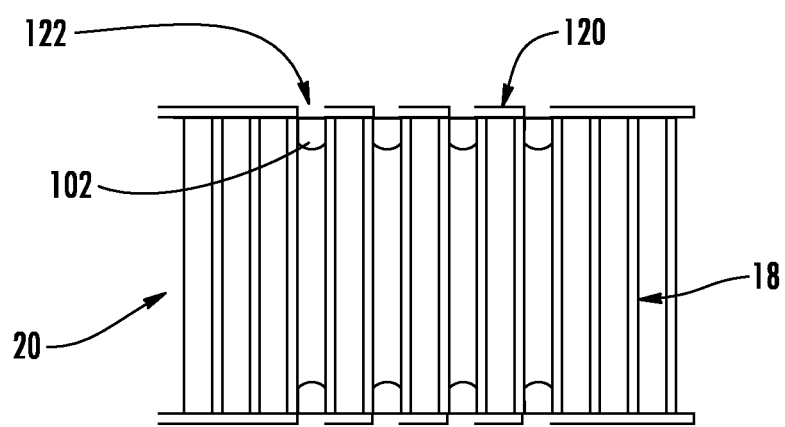
FIG. 22 illustrates temporary fillers and a mask for forming the temporary fillers in an extruded multicellular body or honeycomb.

The filler material may be inserted into the cells 18 by spreading a thin layer of the filler material (e.g., about 1.5 mm thick) on a plate using a blade and then pressing the masked end of the extruded body 20 down into the layer of filler material. The filler material may also be spread directly across the masked end of the extruded body 20 using the blade. Precise thickness control of the filler material need not be achieved, since the temporary fillers 102 will be removed from their cells 18. FIG. 22 illustrates the extruded body 20 with temporary fillers 102 and mask 120. The mask may then be removed and the sheet material 100 applied for the plugging process.

Figure 23:
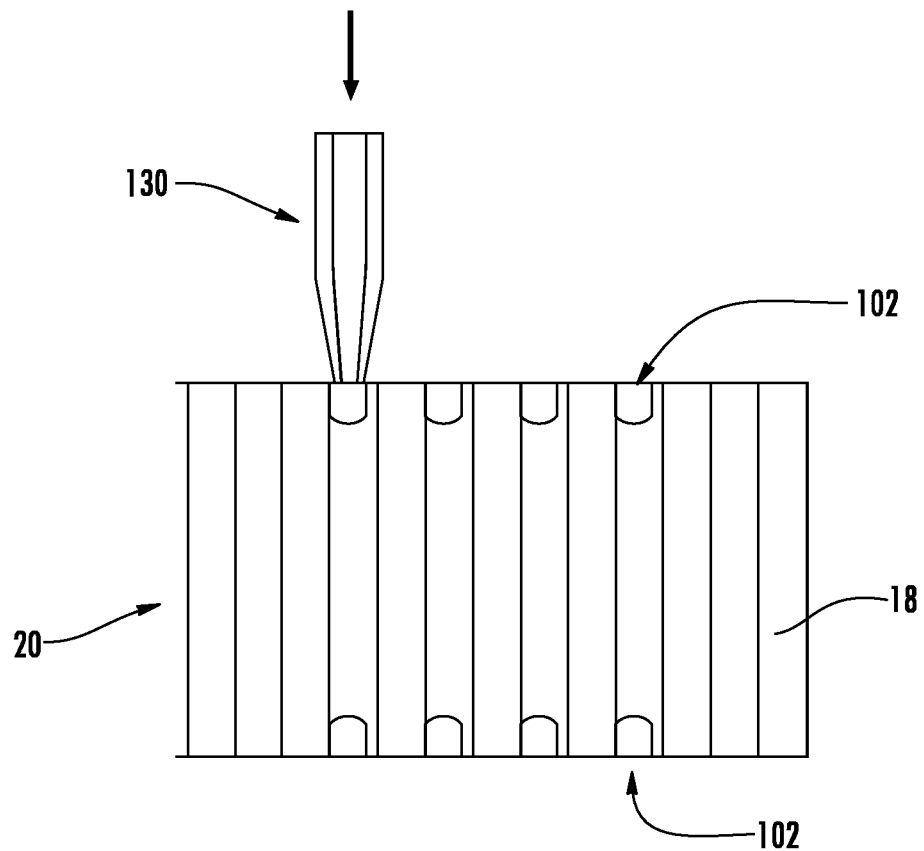
FIG. 23 illustrates another system and method of forming the temporary fillers of FIGS. 19 and 20 according to an embodiment.

Referring to FIG. 23, the filler material may be inserted or injected directly into the selected cells 18, for example, using a filler nozzle 130. The filler nozzle 130 may be sized to inject the filler material directly into a single cell 18 and may be position controlled automatically, for example, using a computer-controlled XYZ stage and cell location data saved in memory. The cell location data may be obtained, for example, using a scanning device, which scans the end face of the extruded body 20.

After the filler material is inserted into the cells 18, the extruded body 20 including the filler material may be heated (e.g., to about 450° C.) to debind the filler material. The filler material that remains forms compact temporary fillers 102 that retains its shape and does not fall into the cell 18. This debinding process may be performed separately or combined with the plug forming process.

It will be apparent to those skilled in the art that various modifications and variations can be made to the embodiments described herein without departing from the spirit and scope of the claimed subject matter. Thus, it is intended that the specification cover the modifications and variations of the various embodiments described herein, provided such modification and variations come within the scope of the appended claims and their equivalents.

What is claimed is:

1. A method of making a fluidic device, the method comprising:
   providing a multicellular body comprising multiple elongated cells extending between opposite end faces of the multicellular body;
   locating temporary fillers in end portions of selected ones of the multiple elongated cells;
   forming permanent plugs in remaining non-plugged ones of the multiple elongated cells in a plug forming process by
      locating unsoftened glass sheet material over at least one of the opposite end faces of the multicellular body,
      softening the unsoftened glass sheet material such that softened glass sheet material flows into the non-plugged cells to form a fluidic passageway through the multicellular body, wherein the temporary fillers block the softened glass sheet material from flowing into the selected cells; and
      hardening the softened glass sheet material within the non-plugged cells; and
   removing the temporary fillers from the end portions of the selected cells.

2. The method of claim 1, wherein the extruded body comprises ceramic.

3. The method of claim 1, wherein a coefficient of thermal expansion of the unsoftened glass sheet material matches a coefficient of thermal expansion of the extruded body.

4. The method of claim 1, wherein the unsoftened glass sheet material is forced against at least one of the opposite end faces by a weight such that the weight forces glass material of the softened sheet into the other multiple elongated cells.

5. The method of claim 4, wherein the plug forming process further comprises:
   locating a refractory felt material between the weight and the unsoftened glass sheet material.

6. The method of claim 1, wherein the fluidic passageway has a longitudinally serpentine path back and forth along the at least some of the multiple elongated cells.

7. The method of claim 1, further comprising:
   applying a mask to at least one of the opposite end faces of the extruded body, the mask having one or more openings corresponding to the selected ones of the multiple elongated cells.

8. The method of claim 7, further comprising:
   forming the one or more openings in the mask by one or more of stencil cutting, tape stripping, laser cutting and photolithographic patterning.

9. The method of claim 7, further comprising:
   spreading a filler material on the mask, the filler material entering the selected ones of the multiple elongated cells through the one or more openings of the mask.

10. The method of claim 9, wherein the filler material comprises silicon carbide powder and a binder.

11. The method of claim 10, further comprising:
   removing the binder from the filler material before softening the unsoftened glass sheet material.

12. The method of claim 9, wherein the filler material comprises a ceramic powder and a binder.

13. The method of claim 9, wherein the filler material has a viscosity of between about 150,000 and 2,000,000 cps.

14. The method of claim 1, further comprising:
   removing the temporary fillers using one or more of a probe and a stream of fluid.

15. The method of claim 1, wherein the plug forming process further comprises:
   placing the temporary fillers in compression as the glass material of the softened sheet flows around the temporary fillers.

16. The method of claim 1, further comprising:
   polishing at least one end face of the extruded body to remove glass sheet material fused to temporary fillers after softening of the unsoftened glass sheet material.

17. The method of claim 1, wherein the plug forming process further comprises:
   locating multiple sheets of unsoftened glass sheet material over at least one of the opposite end faces of the extruded body to tune plug thickness.

18. The method of claim 1, wherein the plug forming process further comprises:
   softening the unsoftened glass sheet material by melting.

19. The method of claim 1, wherein particles forming the temporary fillers are non-spherical to provide resistance to a shape change of the temporary fillers during the plug forming process.

20. The method of claim 1, wherein:
   the temporary fillers comprises a ceramic material and a binder; and
   particles forming the ceramic material of the temporary filler are non-spherical to prevent disintegration of the temporary fillers after the binder has been removed.

* * * * *